United States Patent
Vandervort, III et al.

(10) Patent No.: US 11,547,114 B2
(45) Date of Patent: Jan. 10, 2023

(54) COMBINATION OF PYROGLUTAMIC ACID AND A STROBILURIN FUNGICIDE FOR IMPROVED PLANT HEALTH EFFECTS

(71) Applicant: Verdesian Life Sciences U.S., LLC, Cary, NC (US)

(72) Inventors: Nicholas William Vandervort, III, Cresco, IA (US); Matthew Alan Werner, Morrisville, NC (US); John Samuel Wilson, Cary, NC (US); Nigel M. Grech, Reedley, CA (US)

(73) Assignee: Verdesian Life Sciences U.S., LLC, Cary, NC (US)

( * ) Notice: Subject to any disclaimer, the term of this patent is extended or adjusted under 35 U.S.C. 154(b) by 184 days.

(21) Appl. No.: 16/619,198

(22) PCT Filed: Jun. 5, 2018

(86) PCT No.: PCT/IB2018/054025
§ 371 (c)(1),
(2) Date: Dec. 4, 2019

(87) PCT Pub. No.: WO2018/224966
PCT Pub. Date: Dec. 13, 2018

(65) Prior Publication Data
US 2020/0146288 A1 May 14, 2020

Related U.S. Application Data

(60) Provisional application No. 62/515,279, filed on Jun. 5, 2017.

(51) Int. Cl.
*A01N 43/36* (2006.01)
*A01N 43/54* (2006.01)
(Continued)

(52) U.S. Cl.
CPC ............ *A01N 43/36* (2013.01); *A01N 43/54* (2013.01); *A01N 43/56* (2013.01); *A01N 43/653* (2013.01)

(58) Field of Classification Search
CPC ........ A01N 43/36; A01N 43/54; A01N 43/56; A01N 43/653
See application file for complete search history.

(56) References Cited

U.S. PATENT DOCUMENTS

2006/0084573 A1 4/2006 Grech
2007/0105719 A1 5/2007 Unkefer
(Continued)

FOREIGN PATENT DOCUMENTS

CN 101365337 A 2/2009
CN 102711455 A 10/2012
(Continued)

OTHER PUBLICATIONS

Wang et al, Metabolic effects ofazoxystrobin and kresoxim-methyl against Fusarium kyushuense examined using the Biolog FF MicroPlate, 2016, Pesticide Biochemistry and Physiology, 130, pp. 52-58. (Year: 2015).*

(Continued)

*Primary Examiner* — Trevor Love
(74) *Attorney, Agent, or Firm* — Katten Muchin Rosenman LLP

(57) ABSTRACT

The subject matter described herein relates generally to compositions and formulations and methods of use of combinations of pyroglutamic acid and a strobilurin fungicide for improving plant growth, health and yields, and for protecting plants against selected stress conditions.

19 Claims, 6 Drawing Sheets

(51) Int. Cl.
*A01N 43/56* (2006.01)
*A01N 43/653* (2006.01)

(56) References Cited

U.S. PATENT DOCUMENTS

| | | |
|---|---|---|
| 2010/0209410 A1 | 8/2010 | Schoefl |
| 2013/0102467 A1* | 4/2013 | Bigorra Llosas ...... A01N 25/02 504/206 |
| 2015/0282479 A1 | 10/2015 | Basel et al. |
| 2016/0037768 A1 | 2/2016 | Ohara et al. |
| 2016/0249616 A1 | 9/2016 | Bristow |

FOREIGN PATENT DOCUMENTS

| | | |
|---|---|---|
| CN | 105705019 A | 6/2016 |
| JP | 1059808 A | 3/1998 |
| WO | 0128552 A2 | 4/2001 |
| WO | 2011072811 A3 | 6/2011 |
| WO | 2016089750 A1 | 6/2016 |

OTHER PUBLICATIONS

Paul, P.A., "Meta-Analysis of Yield Response of Hybrid Field Corn to Foliar Fungicides in the U.S. Corn Belt", Ecology and Epidemiology, Jan. 1, 2011, p. 1122-1132, (101)9, APS Journal.
International Search Report for PCT/IB2018/054025 dated Nov. 5, 2018.
Miao Yugang. "Preliminary report on application of pyraclostrobin to prevent diseases and increase yield in corn field", Beijing Agriculture, Issue 33, p. 18, Nov. 30, 2012.

* cited by examiner

COMBINATION OF PYROGLUTAMIC ACID AND A STROBILURIN FUNGICIDE FOR IMPROVED PLANT HEALTH EFFECTS

CROSS-REFERENCE TO RELATED APPLICATIONS

This application is a U.S. National Stage entry of International Application No. PCT/IB2018/054025 filed Jun. 5, 2018, which claims the benefit of U.S. Provisional Patent Application 62/515,279 filed Jun. 5, 2017, each of which is herein incorporated by reference in its entirety for all purposes.

FIELD OF THE INVENTION

The subject matter described herein relates generally to compositions and methods of use of combinations of pyroglutamic acid and a strobilurin fungicide for improving plant growth, health and yields, and for protecting plants against selected stress conditions and for disease control.

BACKGROUND

The use of agrochemicals has greatly enhanced agricultural productivity and yields. Rapid plant growth is desirable as it is an important factor in timing, harvesting and cost of production. As such, rapid plant growth and yield maximization are economically important goals for many agricultural businesses that grow high-value crops.

Though productivity has increased, it has become apparent that there are limits to the amount of agrochemicals that can be added to plants and that can be safely absorbed into the environment. With increased demands on agricultural productivity comes environmental and economic requirements. This is particularly true with regard to the use of agrochemicals during production because of cost and safety. Efficiency of agrochemicals is important because of the associated costs, and the possible impact of agrochemicals on the environment and the health of humans and animals. There is a desire for reduction of the amount of agrochemicals applied; yet, the need for ever-increasing production remains.

What is therefore needed and addressed by the subject matter described herein is an improvement in plant growth, health and yields.

SUMMARY OF THE INVENTION

In one aspect, the subject matter described herein is directed to a composition comprising pyroglutamic acid and a strobilurin fungicide.

In another aspect, the subject matter described herein is directed to methods of increasing plant growth, yields and health, and decreasing disease by contacting a composition comprising pyroglutamic acid and a strobilurin fungicide with the plant or soil in the area of the plant.

In another aspect, the subject matter described herein is directed to formulations suitable for use in agriculture, where the formulations comprise pyroglutamic acid and a strobilurin fungicide and an additive.

In another aspect, the subject matter described herein is directed to methods of preparing the compositions and formulations.

These and other aspects are fully described below.

DETAILED DESCRIPTION

Figure 1:
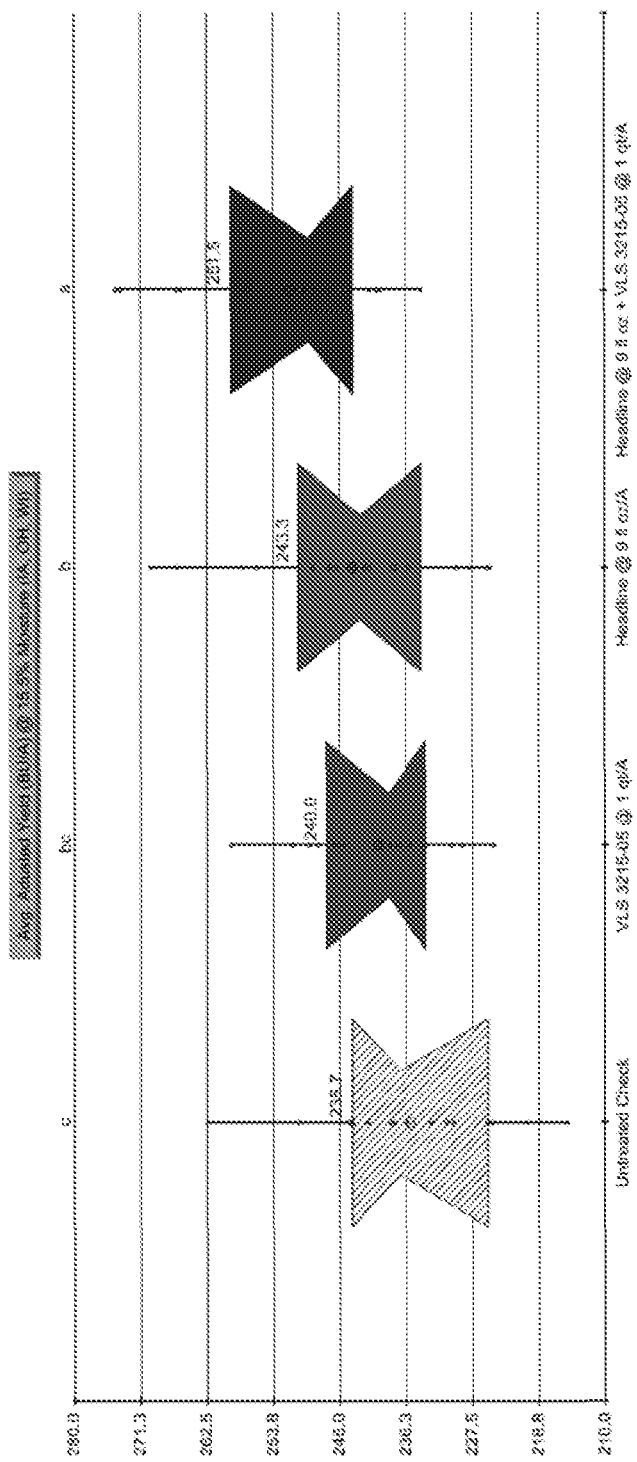
FIG. 1 depicts data for improved yield of the combination as compared to pyraclostrobin alone when applied at VT stage in corn.

The presently disclosed subject matter will now be described more fully hereinafter. However, many modifications and other embodiments of the presently disclosed subject matter set forth herein will come to mind to one skilled in the art to which the presently disclosed subject matter pertains having the benefit of the teachings presented in the foregoing descriptions. Therefore, it is to be understood that the presently disclosed subject matter is not to be limited to the specific embodiments disclosed and that modifications and other embodiments are intended to be included within the scope of the appended claims. In other words, the subject matter described herein covers all alternatives, modifications, and equivalents. In the event that one or more of the incorporated literature, patents, and similar materials differs from or contradicts this application, including but not limited to defined terms, term usage, described techniques, or the like, this application controls. Unless otherwise defined, all technical and scientific terms used herein have the same meaning as commonly understood by one of ordinary skill in this field. All publications, patent applications, patents, and other references mentioned herein are incorporated by reference in their entirety.

Advantageously, the compositions and methods described herein have been shown not only to provide increased yield but increased quality as well. As described fully herein, the compositions and methods provide complex and positive effects on plant outcomes.

In particular, it has been surprisingly found that pyroglutamic acid (PGA, pyroglutamate) in combination with strobilurin fungicides provides substantial improvement in plant health. In embodiments, the improved aspects include a) enhanced disease control, b) enhanced plant health and c) enhanced yield. Accordingly, disclosed herein, are compositions and methods comprising pyroglutamic acid (D and L) and a strobilurin fungicidal active agent. As disclosed herein, field trial data evidences that the combinations of pyroglutamic acid and strobilurin fungicides set forth below provide synergistic effects on plant health, for example, yield. In certain aspects, the PGA/strobilurin combination is for use in crops, such as rice, corn, soybeans and wheat.

I. Definitions

As used herein, "plant" and "crop plant" includes cereals (such as wheat, barley, rye, triticale, sorghum/millet and oats), maize, soya, rice, potatoes, cotton, oilseed rape and fruit species (with the fruits apples, pears, citrus fruit and grapes), sunflower, bean, coffee, beet (for example sugar beet and fodder beet), peanut, oilseed rape, poppy, olive, coconut, cocoa, sugar cane, tobacco, vegetables (such as tomato, cucumbers, onions and lettuce), turf and ornamentals. Plants of interest include plant species grown for the purposes of providing animal nutrition, including but not limited to various grasses and leguminous plants known to the art of animal nutrition. Such plants may either be harvested in various ways known to the art and subsequently used for animal nutrition, or the plants may be consumed (in whole or in part) by animals while the plants are still growing, or while they are still attached to soil. Plants of interest also include any plant used in productive agriculture and needing a nitrogen nutrient supply as these plants would benefit from the compositions described herein. Transgenic plants are also included. Also included are fiber crops, such as cotton and the like.

The term "plant health" describes for example, advantageous properties such as improved crop characteristics including, but not limited to better emergence, increased crop yields, more favorable protein and/or content, more favorable amino acid and/or oil composition, more developed root system (improved root growth), tillering increase, increase in plant height, bigger leaf blade, less dead basal leaves, stronger tillers, greener leaf color, pigment content, photosynthetic activity, less fertilizers needed, less seeds needed, more productive tillers, earlier flowering, early grain maturity, less plant verse (lodging), increased shoot growth, enhanced plant vigor, increased plant stand or early germination; or a combination of at least two or more of the aforementioned effects or any other advantages familiar to a person skilled in the art. Improved plant health can be determined by increased yield of plant product, improved plant vigor, enhanced quality of the plant and/or improved tolerance or resistance of the plant to abiotic and/or biotic stress factors. As compared to control, the increase can be above about 5%, above about 10%, above about 15%, above about 20%, above about 25%, above about 30%, above about 35%, above about 40%, above about 45%, or above about 50%; or the improvement can be from about 5% to about 50%, or from about 5% to about 35%, or from about 5% to about 25%, or from about 10% to about 20%. In particular, the improvement can be the result of a synergistic effect.

As used herein, the term "staygreen" specifically refers to maintenance of green color or photosynthetically-active plant tissue. Staygreen can be measured as a percentage of canopy tissue remaining green and photosynthetically active compared to untreated foliage.

The term "synergistic effect" means that the improvement in the development of the plant in relation to at least one effect is increased to an extent greater than that resulting from an additive effect. An additive effect is the expected effect due to each active compound acting individually. A synergistic effect occurs to a significantly greater degree than an additive effect. The expected activity for a given combination of two active compounds can be calculated as follows (cf. Colby, S. R., "Calculating Synergistic and Antagonistic Responses of Herbicide Combinations", Weeds 15, pages 20-22, 1967). The synergistic effect of the active ingredient combination used in accordance with the embodiments allows the total application rate of the substances to achieve the same effect to be reduced. The rates of the active ingredients described herein include the known application rates for each.

By the term "contact" or "contacting" it is intended to allow the compositions and formulations to come in physical communication with the plant or its surroundings, such as the soil adjacent or in the vicinity of the plant. Contacting can be by any conventional means.

As used herein, the term "foliar region" refers primarily to the leaves of the plant. Additional definitions are set forth herein below.

II. Combination Products

In embodiments, the subject matter described herein is directed to compositions comprising pyroglutamic acid and at least one strobilurin fungicide. The pyroglutamic acid and strobilurin fungicide(s) can be present in synergistic amounts. Without being bound to theory, embodiments of the combination compositions can provide a surprising increase in carbon assimilation of the plant.

Pyroglutamic acid (pyroglutamate) has the following stereochemical structures:

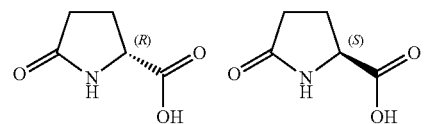

Pyroglutamic acid exists in two forms, the D (R) and L (S) stereoisomers. As such, pyroglutamic acid can be present in the combination products as D or L or a ratio of D:L, as set forth elsewhere herein. Derivatives of pyroglutamic acid includes its salts. The neutral salt is the preferred derivative.

Useful strobilurins include those selected from the group consisting of pyraclostrobin, azoxystrobin, dimoxystrobin, enestroburin, fluoxastrobin, kresoxim-methyl, metominostrobin, orysastrobin, picoxystrobin, pyribencarb, trifloxystrobin, pyrametostrobin, pyraoxystrobin, coumoxystrobin, coumethoxystrobin, triclopyricarb (chlorodincarb), fenaminstrobin (diclofenoxystrobin), fenoxystrobin, 2-(2-(6-(3-chloro-2-methyl-phenoxy)-5-fluoro-pyrimidin-4-yloxy)-phenyl)-2-methoxyimino-N-methyl-acetamide, 3-methoxy-2-(2-(N-(4-methoxy-phenyl)-cyclopropane-carboximidoylsulfanylmethyl)-phenyl)-acrylic acid methyl ester, methyl (2-chloro-5-[1-(3-methylbenzyloxyimino) ethyl]benzyl)carbamate and 2-(2-(3-(2,6-dichlorophenyl)-1-methyl-allylideneaminooxymethyl)-phenyl)-2-methoxy-imino-N methyl-acetamide. In particular, the strobilurin is pyraclostrobin.

In embodiments, the pyroglutamic acid and the strobilurin fungicide are present in synergistically effective amounts. In embodiments, the pyroglutamic acid and the pyraclostrobin are present in synergistically effective amounts. In embodiments, the pyroglutamic acid and the azoxystrobin are present in synergistically effective amounts.

In embodiments, the compositions comprise pyroglutamic acid in an amount from about 10% w/w to about 90% w/w of the composition, or from about 20% w/w to about 85% w/w, or from about 40% w/w to about 80% w/w of the composition, or from about 50% w/w to about 70% w/w of the composition, or from about 55% w/w to about 65% w/w of the composition, or from about 60% w/w to about 63% w/w of the composition. In embodiments, the compositions comprise at least one strobilurin fungicide present in an amount from about 20% w/w to about 60% w/w of the composition, or from about 30% w/w to about 50% w/w of the composition, or from about 35% w/w to about 45% w/w of the composition, or from about 37% w/w to about 40% w/w of the composition.

Useful ratios of pyroglutamic acid (PGA) to strobilurin fungicide include 1 (PGA):3 (strobilurin); 1 (PGA):2 (strobilurin); 1 (PGA):1 (strobilurin); 2 (PGA):1 (strobilurin); 3 (PGA):1 (strobilurin). In embodiments, the ratio of PGA to strobilurin fungicide is about 1-3 (PGA):1 (strobilurin). In embodiments, the ratio of pyroglutamic acid to strobilurin fungicide is about 1.5-2.5 (PGA):1 (strobilurin). In embodiments, the ratio of pyroglutamic acid to strobilurin fungicide is about 1.5-1.8 (PGA):1 (strobilurin).

In embodiments, the ratio of pyroglutamic acid to strobilurin fungicide is about 1.6 (PGA):1 (strobilurin).

Embodiments of the compositions include those where the pyroglutamic acid is stereochemically enhanced or purified. The commercially available pyroglutamate, synthesized by a bacterial fermentation process, has a stereochemistry ratio of approximately 60:40 of the L isomer to the D isomer. In embodiments, the compositions described herein contain L and D isomers of pyroglutamate in various ratios and contribute to the efficacy of such compositions in promoting plant growth and yield, and resistance to stresses. In embodiments, the pyroglutamic acid is L-pyroglutamic acid. In embodiments, the pyroglutamic acid is a mixture of L- and D-pyroglutamic acid. In these embodiments, the ratio of L to D is from about 80:20 to about 97:3. In embodiments, the total pyroglutamic acid is supplied as a ratio of L to a mixture of D/L, such as, 3-4.5:1 (D:D/L).

The compositions can contain further additives as described elsewhere herein. For example, the compositions can contain one or more of soluble potash, sulfur, boron, manganese, iron, zinc, and other ingredients and excipients as described herein. The PGA portion can be added to the formulation as a mixture that contains such other ingredients.

In embodiments, the composition further comprises phosphite. The amount of phosphite can be from about 0.1% to about 20% w/w, e.g., about 0.1%, about 0.2%, about 0.3%, about 0.4%, about 0.5%, about 0.6%, about 0.7%, about 0.8%, about 0.9%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, or about 20%.

In embodiments, the composition further comprises a chelating agent. The chelating agent is selected from the group consisting of iron chelating agent, a manganese chelating agent, and a zinc chelating agent. The amount of chelating agent(s) can be from about 0.1% to about 20% w/w, e.g., about 0.1%, about 0.2%, about 0.3%, about 0.4%, about 0.5%, about 0.6%, about 0.7%, about 0.8%, about 0.9%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, or about 20%.

In embodiments, the composition further comprises dimethyl sulfone. The dimethyl sulfone can be present from about 1% to about 12% w/w, e.g., about 1%, about 2%, about 3%, about 4%, about 5%, about 6%, about 7%, about 8%, about 9%, about 10%, about 11% or about 12%.

In particularly useful embodiments, the composition comprises pyroglutamic acid in an amount from about 40% w/w to about 80% w/w, a strobilurin in an amount from about 20% w/w to about 60% w/w, and one or more chelating agents. In particularly useful embodiments, the composition comprises pyroglutamic acid in an amount from about 50% w/w to about 70% w/w, a strobilurin in an amount from about 30% w/w to about 50% w/w, and one or more chelating agents. In particularly useful embodiments, the composition comprises pyroglutamic acid in an amount from about 55% w/w to about 65% w/w, a strobilurin in an amount from about 35% w/w to about 45% w/w, and one or more chelating agents. In these embodiments, a particular strobilurin is pyraclostrobin or azoxystrobin, and the one or more chelating agents comprise an iron chelating agent, a manganese chelating agent, and a zinc chelating agent. A particularly useful composition comprises about 62% w/w PGA and about 38% strobilurin.

The synergistic compositions comprising PGA and a strobilurin can further include a triazole. Useful triazoles include those selected from the group consisting of azaconazole, bitertanol, bromuconazole, cyproconazole, difenoconazole, diniconazole, diniconazole-M, epoxiconazole, fenbuconazole, fluquinconazole, flusilazole, flutriafol, hexaconazole, imibenconazole, ipconazole, metconazole, myclobutanil, oxpoconazole, paclobutrazole, penconazole, propiconazole, prothioconazole, simeconazole, tebuconazole, tetraconazole, triadimefon, triadimenol, triticonazole, uniconazole, and 1-(4-chloro-phenyl)-2-([1,2,4]triazol-1-yl)-cycloheptanol. In particular, the triazole is selected from the group consisting of azaconazoles, bitertanol, bromuconazole, cyproconazole, epoxyconazole, fluquinconazole, hexaconazole, metconazole, penconazole, propioconazole, tebuconazole, tetraconazole or triadimenol and their metal salts and acid adducts. It is understood that certain triazole compounds can contain chiral centers, and therefore the compositions described herein can include stereoisomers, such as enantiomers and diastereomers. The compositions described herein can include mixtures of such stereoisomers or individual stereoisomers. In embodiments, the triazole is propiconazole.

When present, in embodiments, the amount of triazole can be from about 0.7:1 to about 1:3 relative to the amount of strobilurin present. When present, in embodiments, the amount of triazole can be from about 0.8:1 relative to the amount of strobilurin present. When present, in embodiments, the amount of triazole can be from about 0.9:1 relative to the amount of strobilurin present. When present, in embodiments, the amount of triazole can be from about 1:1 relative to the amount of strobilurin present. When present, in embodiments, the amount of triazole can be from about 1:1.1 relative to the amount of strobilurin present. When present, in embodiments, the amount of triazole can be from about 1:1.2 relative to the amount of strobilurin present. When present, in embodiments, the amount of triazole can be from about 1:1.3 relative to the amount of strobilurin present. When present, in embodiments, the amount of triazole can be from about 1:1.4 relative to the amount of strobilurin present. When present, in embodiments, the amount of triazole can be from about 1:1.5 relative to the amount of strobilurin present. When present, in embodiments, the amount of triazole can be from about 1:1.6 relative to the amount of strobilurin present. When present, in embodiments, the amount of triazole can be from about 1:1.7 relative to the amount of strobilurin present. When present, in embodiments, the amount of triazole can be from about 1:1.8 relative to the amount of strobilurin present. When present, in embodiments, the amount of triazole can be from about 1:1.9 relative to the amount of strobilurin present. When present, in embodiments, the amount of triazole can be from about 1:2.0 relative to the amount of strobilurin present. When present, in embodiments, the amount of triazole can be from about 1:2.1 relative to the amount of strobilurin present. When present, in embodiments, the amount of triazole can be from about 1:2.2 relative to the amount of strobilurin present. When present, in embodiments, the amount of triazole can be from about 1:2.3 relative to the amount of strobilurin present. When present, in embodiments, the amount of triazole can be from about 1:2.4 relative to the amount of strobilurin present. When present, in embodiments, the amount of triazole can be from about 1:2.5 relative to the amount of strobilurin present. When present, in embodiments, the amount of triazole can be from about 1:2.6 relative to the amount of strobilurin present. When present, in embodiments, the amount of triazole can be from about 1:2.7 relative to the amount of strobilurin present. When present, in embodiments, the amount of triazole can be from about 1:2.8 relative to the amount of strobilurin present. When present, in embodiments, the amount of triazole can be from about 1:2.9 relative to the amount of strobilurin present. When present, in embodiments, the amount of triazole can be from about 1:3.0 relative to the amount of strobilurin present.

The compositions described herein can be formulated in any useful formulation.

III. Formulations

Formulations comprising pyroglutamic acid and a strobilurin fungicide can be in any useful form. Depending on their desired physical and/or chemical properties, formulations can be in the form of liquids, solids, aerosols, capsule suspensions, cold-fogging concentrates, warm-fogging concentrates, encapsulated granules, fine granules, flowable concentrates, ready-to-use solutions, dustable powders, emulsifiable concentrates, oil-in-water emulsions, water-in-oil emulsions, macrogranules, microgranules, oil-dispersible powders, oil-miscible flowable concentrates, oil-miscible liquids, gas (under pressure), gas generating product, foams, pastes, suspension concentrates, soluble concentrates, suspensions, wettable powders, soluble powders, dusts and granules, water-soluble and water-dispersible granules or tablets, water-soluble and water-dispersible powders, wettable powders, microencapsulations in polymeric substances and in coating materials. For purposes of the present disclosure, "ready-to-use" refers to compositions that are not in a concentrate form but rather which may be applied without modification of the relative amounts of components within the product. In embodiments, compositions and formulations are provided in concentrates for end-use tank-mixing.

In embodiments, a formulation comprising, pyroglutamic acid and a strobilurin fungicide, is a type selected from the group consisting of emulsifiable concentrate, soluble concentrate, oil-in-water emulsion, microemulsion, oil based suspension concentrate, suspension concentrate, and dispersible concentrate. In embodiments, the formulation is an emulsifiable concentrate or a soluble concentrate. In embodiments, the PGA portion can be supplied as a mixture comprising PGA, in label amounts (weight %) and isomer ratios as described herein, soluble pot ash at about 5%, sulfur at about 2%, boron at about 10%, manganese at about 0.25%, iron at about 0.2% and zinc at about 0.248%. In embodiments, the PGA portion can be supplied as a mixture comprising PGA, in label amounts and isomer ratios as described herein, soluble pot ash at about 15%, sulfur at about 14%, and iron at about 0.5%. The PGA portion can further comprise phosphoric acid in amounts from about 10% to about 30%, or from about 15% to about 25%. The PGA portion can contain total nitrogen of about 1% to about 10%, or from about 3% to about 7%, or about 5%. The PGA portion components described herein can be in the form of ferrous sulfate, manganese sulfate, zinc sulfate, and urea (nitrogen). All amounts include label amounts.

The formulations include those which are ready-for-use and can be applied with a suitable apparatus to the plant, and also commercial concentrates which have to be diluted with water prior to use, e.g., a tank mix. Customary applications are, for example, dilution in water and subsequent spraying of the resulting spray liquid, application after dilution in oil, or direct application without dilution.

Formulations can include solvents. Suitable organic solvents include all polar and non-polar organic solvents usually employed for formulation purposes. Preferable the solvents are selected from ketones, e.g. methyl-isobutylketone and cyclohexanone, amides, e.g. dimethyl formamide and alkanecarboxylic acid amides, e.g. N,N-dimethyl decaneamide and N,N-dimethyl octanamide, furthermore cyclic solvents, e.g. N-methyl-pyrrolidone, N-octyl-pyrrolidone, N-dodecylpyrrolidone, N-octyl-caprolactame, N-dodecyl-caprolactame and butyrolactone, furthermore strong polar solvents, e.g. dimethylsulfoxide, and aromatic hydrocarbons, e.g. xylol, SOLVESSO™, mineral oils, e.g. white spirit, petroleum, alkyl benzenes and spindle oil, also esters, e.g. propyleneglycol-monomethylether acetate, adipic acid dibutylester, acetic acid hexylester, acetic acid heptylester, citric acid tri-n-butylester and phthalic acid di-n-butylester, and also alcohols, e.g. benzyl alcohol and 1-methoxy-2-propanol. Useful liquid solvents are essentially: aromatics such as xylene, toluene or alkylnaphthalenes, chlorinated aromatics and chlorinated aliphatic hydrocarbons such as chlorobenzenes, chloroethylenes or dichloromethane, aliphatic hydrocarbons such as cyclohexane or paraffins, for example mineral oil fractions, mineral and vegetable oils, alcohols such as butanol or glycol and their ethers and esters, ketones such as acetone, methyl ethyl ketone, methyl isobutyl ketone or cyclohexanone, strongly polar solvents such as dimethylformamide and dimethyl sulphoxide, and also water. The solvent can be present in an amount of from about 1% to about 99% w/w, for example, about 5% to about 75%, or about 15% to about 70%, or about 25% to about 65%, or about 35% to about 60%, or about 40% to about 55%, or about 45% to about 50%. In embodiments, the solvent is water.

Formulations can include carriers and fillers. A carrier is a natural or synthetic, organic or inorganic substance for admixing or combining with the compositions for better applicability, in particular for application to plants or plant parts. The carrier, which may be solid or liquid, is generally inert and should be suitable for use in agriculture. Useful solid or liquid carriers include: for example ammonium salts and natural rock dusts, such as kaolins, clays, talc, chalk, quartz, attapulgite, montmorillonite or diatomaceous earth, and synthetic rock dusts, such as finely divided silica, alumina and natural or synthetic silicates, resins, waxes, solid fertilizers, water, alcohols, especially butanol, organic solvents, mineral and vegetable oils, and derivatives thereof. Mixtures of such carriers can likewise be used.

Suitable solid filler and carrier include inorganic particles, e.g. carbonates, silicates, sulphates and oxides with an average particle size of between 0.005 and 20 µm, preferably of between 0.02 to 10 µm, for example ammonium sulphate, ammonium phosphate, urea, calcium carbonate, calcium sulphate, magnesium sulphate, magnesium oxide, aluminum oxide, silicium dioxide, so-called fine-particle silica, silica gels, natural or synthetic silicates, and alumosilicates and plant products like cereal flour, wood powder/sawdust and cellulose powder.

Useful solid carriers include: for example crushed and fractionated natural rocks such as calcite, marble, pumice, sepiolite, dolomite, and synthetic granules of inorganic and organic meals, and also granules of organic material such as sawdust, coconut shells, maize cobs and tobacco stalks.

Useful liquefied gaseous extenders or carriers are those liquids which are gaseous at standard temperature and under standard pressure, for example aerosol propellants such as halohydrocarbons, and also butane, propane, nitrogen and carbon dioxide.

Formulations can include other additional components, for example protective colloids, binders, extenders, adhesives, tackifiers, thickeners, thixotropic substances, penetrants, stabilizers, sequestrants, surfactants, complexing agents, etc. In general, the compositions can be combined with any solid or liquid additive commonly used for formulation purposes.

In the formulations, it is possible to use tackifiers such as carboxymethylcellulose, and natural and synthetic polymers in the form of powders, granules or lattices, such as gum arabic, polyvinyl alcohol and polyvinyl acetate, or else natural phospholipids, such as cephalins and lecithins, and synthetic phospholipids. Further additives may be mineral and vegetable oils. If the extender used is water, it is also possible to employ, for example, organic solvents as auxiliary solvents.

The formulations may additionally comprise surfactants. Useful surfactants are emulsifiers and/or foam formers, dispersants or wetting agents having ionic or nonionic properties, or mixtures of these surfactants. Examples of these are salts of polyacrylic acid, salts of lignosulphonic acid, salts of phenolsulphonic acid or naphthalenesulphonic acid, polycondensates of ethylene oxide with fatty alcohols or with fatty acids or with fatty amines, substituted phenols (preferably alkylphenols or arylphenols), salts of sulphosuccinic esters, taurine derivatives (preferably alkyl taurates), phosphoric esters of polyethoxylated alcohols or phenols, fatty esters of polyols, and derivatives of the compounds containing sulphates, sulphonates and phosphates, for example alkylaryl polyglycol ethers, alkylsulphonates, alkylsulphates, arylsulphonates, protein hydrolysates, lignosulphite waste liquors and methylcellulose. The presence of a surfactant is necessary if one of the active ingredients and/or one of the inert carriers is insoluble in water and when application is effected in water. The proportion of surfactants is between 5 and 40 percent by weight of the composition.

Suitable surfactants (adjuvants, emulsifiers, dispersants, protective colloids, wetting agent and adhesive) include all common ionic and non-ionic substances, for example ethoxylated nonylphenols, polyalkylene glycolether of linear or branched alcohols, reaction products of alkyl phenols with ethylene oxide and/or propylene oxide, reaction products of fatty acid amines with ethylene oxide and/or propylene oxide, furthermore fattic acid esters, alkyl sulfonates, alkyl sulphates, alkyl ethersulphates, alkyl etherphosphates, arylsulphate, ethoxylated arylalkylphenols, e.g. tristyrylphenol-ethoxylates, furthermore ethoxylated and propoxylated arylalkylphenols like sulphated or phosphated arylalkylphenol-ethoxylates and -ethoxy- and -propoxylates.

Further examples are natural and synthetic, water soluble polymers, e.g. lignosulphonates, gelatine, gum arabic, phospholipides, starch, hydrophobic modified starch and cellulose derivatives, in particular cellulose ester and cellulose ether, further polyvinyl alcohol, polyvinyl acetate, polyvinyl pyrrolidone, polyacrylic acid, polymethacrylic acid and co-polymerisates of (meth)acrylic acid and (meth)acrylic acid esters, and further co-polymerisates of methacrylic acid and methacrylic acid esters which are neutralized with alkali-metal hydroxide and also condensation products of optionally substituted naphthalene sulfonic acid salts with formaldehyde.

The formulations may comprise colorants and dyes. Dyes include inorganic pigments, for example iron oxide, titanium oxide and Prussian Blue, and organic dyes such as alizarin dyes, azo dyes and metal phthalocyanine dyes, and trace nutrients such as salts of iron, manganese, boron, copper, cobalt, molybdenum and zinc. In embodiments, when present, boron can be in amounts from about 2% to about 15% of the composition, or from about 5% to about 13% of the composition, or from about 8% to about 12% of the composition, or about 10% of the composition. In embodiments, when present, sulfur can be in amounts from about 0.1% to about 15% of the composition, or from about 0.5% to about 14% of the composition, or from about 1% to about 3% of the composition, or about 1%, 2%, 3%, 4%, 5%, 6%, 7%, 8%, 9%, 10%, 11%, 12%, 13%, 14% or 15% of the composition. In embodiments, when present, soluble potash can be in amounts from about 1% to about 25% of the composition; or from about 2% to about 22% of the composition, or from about 3% to about 20% of the composition, or from about 4% to about 10% of the composition, or about 5% of the composition; or about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24% or 25% of the composition. In embodiments, when present, manganese can be in amounts from about 0.1% to about 0.5% of the composition, or from about 0.12% to about 0.4% of the composition, or from about 0.2% to about 0.3% of the composition, or about 0.25% of the composition. In embodiments, when present, zinc can be in amounts from about 0.1% to about 0.5% of the composition, or from about 0.12% to about 0.4% of the composition, or from about 0.2% to about 0.3% of the composition, or about 0.25% of the composition. In embodiments, when present, iron can be in amounts from about 0.05% to about 1.0% of the composition, or from about 0.1% to about 0.8% of the composition, or from about 0.15% to about 0.25% of the composition, or about 0.2% of the composition; or about 0.1%, 0.2%, 0.3%, 0.4%, 0.5%, 0.6%, 0.7%, 0.8%, 0.9% or 1.0%.

In an embodiment, in addition to the PGA and strobilurin, and optionally triazole, each in amounts as described herein, the formulation further comprises other ingredients and trace components. In an embodiment, in addition to the PGA and strobilurin, and optionally triazole, each in amounts as described herein, the formulation further comprises soluble potash, sulfur, boron, manganese, iron and zinc in amounts described herein. As described elsewhere, the formulation can be in the form of a concentrate.

Antifoams which may be present in the formulations include e.g. silicone emulsions, long-chain alcohols, fatty acids and their salts as well as fluoroorganic substances and mixtures thereof.

Thickeners include polysaccharides, e.g. xanthan gum or veegum, silicates, e.g. attapulgite, bentonite as well as fine-particle silica.

The amounts of active ingredients in the compositions and formulations are generally between 0.05 and 99% by weight, 0.01 and 98% by weight, preferably between 0.1 and 95% by weight, more preferably between 0.5 and 90% of active ingredients, most preferably between 10 and 70% by weight. Depending on the formulation and desired route of application, one of ordinary skill in the art can determine appropriate amounts of active ingredients and additives, and the amount of active ingredient(s) and additive(s) in the formulations may vary in a broad range. The concentration of the active ingredients in the application forms is generally between 0.000001 to 95% by weight.

The formulations mentioned can be prepared in a manner known, for example by mixing the active ingredients with at least one customary extender, solvent or diluent, adjuvant, emulsifier, dispersant, and/or binder or fixative, wetting agent, water repellent, if appropriate desiccants and UV stabilizers and, if appropriate, dyes and pigments, antifoams, preservatives, inorganic and organic thickeners, adhesives, gibberellins and also further processing auxiliaries and also water. Depending on the formulation type to be prepared further processing steps are necessary, e.g. wet grinding, dry grinding and granulation.

The formulations can include other known active ingredients, such as insecticides, attractants, sterilants, bactericides, acaricides, nematicides, growth regulators, herbicides, fertilizers, and the like. In embodiments, the formulations are suitable for seed coating.

IV. Methods

The methods described herein involve treatment of the plants and plant parts with the compositions or formulations directly or by action on their surroundings, by any customary treatment methods, for example by dipping, spraying, atomizing, irrigating, evaporating, dusting, fogging, broadcasting, foaming, painting, spreading-on, watering (drenching), drip irrigating and, in the case of propagation material, slurry treatment, incrustation, coating with one or more coats, etc. It is also possible to deploy the compositions or formulations by the ultra-low volume method or to inject the compositions or formulations into the soil. In particular, the methods can be used on soil by placing, dropping, spreading, spraying, broadcasting, deep or sub-surface placement, localized placement, contact, band, hill, and row placement, knife-in, etc. and any other method. Also contemplated are treatment of above-ground parts of plants, of propagation stock, and of the soil. The soil may be in the area near or adjacent, i.e., vicinity, to a plant of interest, such as a crop plant. Increased yield can refer to total biomass per hectare, yield per hectare, kernel/fruit weight, grain protein content, seed size and/or hectoliter weight as well as to increased product quality, comprising: improved processability relating to size distribution (kernel, fruit, etc.), homogenous riping, grain moisture, better milling, better vinification, increased juice yield, harvestability, digestibility, sedimentation value, falling number, pod stability, storage stability, improved fiber length/strength/uniformity, increase of milk and/or meat quality of silage fed animals; further comprising improved marketability relating to improved fruit/grain quality, size distribution (kernel, fruit, etc.), increased storage/shelf-life, firmness/softness, taste (aroma, texture, etc.), grade (size, shape, number of berries, etc.), number of berries/fruits per bunch, crispness, freshness, coverage with wax, frequency of physiological disorders, color, etc.; further comprising increased desired ingredients such as e.g. protein content, fatty acids, oil content, oil quality, amino acid composition, sugar content, acid content (pH), sugar/acid ratio (Brix), polyphenols, starch content, nutritional quality, gluten content/index, energy content, taste, etc.; and further comprising decreased undesired ingredients such as e.g. less mycotoxines, less aflatoxines, geosmin level, phenolic aromas, lacchase, polyphenol oxidases and peroxidases, nitrate content, etc.

When using the compositions and formulations, the application rates can be varied within a relatively wide range, depending on the kind of application and the crop. The application rate of the mixtures or compositions is in the case of treatment of plant parts, for example leaves: from 0.1 to 10,000 g/ha, preferably from 10 to 1,000 g/ha, more preferably from 10 to 800 g/ha, even more preferably from 50 to 300 g/ha (in the case of application by watering or dripping, it is even possible to reduce the application rate, especially when inert substrates such as rockwool or perlite are used); in the case of soil treatment: from 0.1 to 10 000 g/ha, preferably from 1 to 5000 g/ha. The application rates can be measured in fluid ounces as well. These application rates are merely by way of example and are not limiting as one of ordinary skill in this field can adjust the application rates as desired. Also the formulations can be applied to seeds to produce a seed coated with a formulation as described herein.

In embodiments, the active agents can be applied at rates that include PGA at an amount of about 50 g to about 120 g per acre, and strobilurin at an amout from about 40 g to about 100 g per acre. In embodiments, the active agents can be applied at rates that include PGA at an amount of about 100 g to about 120 g per acre, and strobilurin at an amount from about 60 g to about 80 g per acre. In embodiments, the active agents can be applied at rates that include PGA at an amount of about 105 g to about 115 g per acre, and strobilurin at an amount from about 65 g to about 75 g per acre. In embodiments, the active agents can be applied at rates that include PGA at an amount of about 107 g to about 110 g per acre, and strobilurin at an amount from about 66 g to about 69 g per acre. All of these embodiments can further include a triazole at an amount that is from about 0.7:1 to about 1:3, relative to the strobilurin.

The methods of treatment provide contacting, i.e., use or application of compounds in a simultaneous, separate or sequential manner. If the single active ingredients are applied in a sequential manner, i.e. at different times, they are applied one after the other within a reasonably short period, such as a few hours or days. In embodiments, the subject matter disclosed herein is directed to a method of increasing the yield of a crop comprising, applying to a plant or soil in the vicinity of the plant a composition comprising, pyroglutamic acid and a strobilurin fungicide, wherein the yield is measured in bu/A. All of these embodiments can further include a triazole at an amount that is from about 0.7:1 to about 1:3, relative to the strobilurin.

In embodiments, the subject matter disclosed herein is directed to a method of increasing the grain yield of a crop comprising, applying to a plant or soil in the vicinity of the plant a composition comprising, pyroglutamic acid and a strobilurin fungicide, wherein the yield is measured in bu/A. All of these embodiments can further include a triazole at an amount that is from about 0.7:1 to about 1:3, relative to the strobilurin. The grain yield can be increased by about 3% to about 30%, or from about 5% to about 20% compared to untreated crop, or from about 6% to about 19%, or from about 7% to about 17%, or from about 8% to about 14%, or from about 9% to about 11%, or about 3%, or about 4%, or about 5%, or about 6%, or about 7%, or about 8%, or about 9%, or about 10%, or about 11%, or about 12%, or about 13%, or about 14%, or about 15%, or about 16%, or about 17%, or about 18%, or about 19%, or about 20%, or about 21%, or about 22%, or about 23%, or about 24%, or about 25%, or about 26%, or about 27%, or about 28%, or about 29%, or about 30%, all as compared to control.

In embodiments, the subject matter disclosed herein is directed to a method of increasing the grain protein content of a crop comprising, applying to a plant or soil in the vicinity of the plant a composition comprising, pyroglutamic acid and a strobilurin fungicide, wherein the yield is measured in bu/A. All of these embodiments can further include a triazole at an amount that is from about 0.7:1 to about 1:3, relative to the strobilurin. The grain protein content can be increased by about 3% to about 30%, or from about 5% to about 20% compared to untreated crop, or from about 6% to about 19%, or from about 7% to about 17%, or from about 8% to about 14%, or from about 9% to about 11%, or about 3%, or about 4%, or about 5%, or about 6%, or about 7%, or about 8%, or about 9%, or about 10%, or about 11%, or about 12%, or about 13%, or about 14%, or about 15%, or about 16%, or about 17%, or about 18%, or about 19%, or about 20%, or about 21%, or about 22%, or about 23%, or about 24%, or about 25%, or about 26%, or about 27%, or about 28%, or about 29%, or about 30%, all as compared to control.

In embodiments, the subject matter disclosed herein is directed to a method of improving the health of a crop comprising, applying to a plant or soil in the vicinity of the plant a composition comprising, pyroglutamic acid and a strobilurin fungicide, wherein the health is measured in percent staygreen. All of these embodiments can further include a triazole at an amount that is from about 0.7:1 to about 1:3, relative to the strobilurin.

In embodiments, the subject matter disclosed herein is directed to a method of improving the disease resistance of a crop comprising, applying to a plant or soil in the vicinity of the plant a composition comprising, pyroglutamic acid and a strobilurin fungicide, wherein the disease resistance is measured in % reduction in occurrence of a particular disease. All of these embodiments can further include a triazole at an amount that is from about 0.7:1 to about 1:3, relative to the strobilurin.

In embodiments, the crop is in a post-vegetative stage, for example, the crop is in the VT stage to the R1 stage. In embodiments, performance of the application of the combination formulation is at panicle initiation, R0-R1, e.g., when the crop is rice. Assessment of effects will be at a later stage, e.g., it can be performed at stage R9 in rice.

In embodiments, the plant is a crop as described elsewhere herein. In embodiments, the crop is selected from the group consisting of cereals (wheat, barley, oats, triticale, rye, and rice), maize, soya beans, potatoes, vegetables, peanuts, cotton, oilseed rape and fruit plants. In embodiments, the crop is maize. In embodiments, the crop is rice.

In embodiments, the yield in bu/A is increased about 5% to about 25% as compared to an untreated crop, or about 5% to about 15% as compared to an untreated crop, or about 5% to about 8% as compared to an untreated crop, or the yield in bu/A is increased about 10% as compared to an untreated crop. In embodiments, the yield in bu/A is increased about 5%, about 6%, about 7%, about 8%, about 9%, about 10%, about 11%, about 12%, about 13%, about 14%, about 15%, about 16%, about 17%, about 18%, about 19%, about 20%, 21%, about 22%, about 23%, about 24% or about 25%. In an embodiment, the composition comprises pyroglutamic acid in an amount of about 62% w/w, a strobilurin in an amount of about 38% w/w, and one or more chelating agents, the crop is maize, and the yield in bu/A is increased about 10% as compared to an untreated maize. All of these embodiments can further include a triazole at an amount that is from about 0.7:1 to about 1:3, relative to the strobilurin.

In embodiments, the methods comprise applying pyroglutamic acid in the form of L-pyroglutamic acid. In embodiments, the methods comprise applying pyroglutamic acid as a mixture of L- and D-pyroglutamic acid in a ratio of L to D of from about 80:20 to about 97:3.

In embodiments, the compositions and formulations can also exhibit a potent strengthening effect in plants. Accordingly, they can be used for mobilizing the defences of the plant against attack by undesirable microorganisms. Plant-strengthening (resistance-inducing) substances are to be understood as meaning, in the present context, those substances which are capable of stimulating the defense system of plants in such a way that the treated plants, when subsequently inoculated with undesirable microorganisms, develop a high degree of resistance to these microorganisms.

Abiotic stress tolerance, comprising temperature tolerance, drought tolerance and recovery after drought stress, water use efficiency (correlating to reduced water consumption), flood tolerance, ozone stress and UV tolerance, tolerance towards chemicals like heavy metals, salts, pesticides, etc. Biotic stress tolerance, comprising increased fungal resistance and increased resistance against nematodes, viruses and bacteria. In context with the present disclosure, biotic stress tolerance preferably comprises increased fungal resistance.

Increased plant vigor includes plant quality, reduced stand failure, improved appearance, increased recovery, improved greening effect and improved photosynthetic efficiency. Beneficial effects can also include earlier germination, better emergence, more developed root system and/or improved root growth, increased ability of tillering, more productive tillers, earlier flowering, increased plant height and/or biomass, shorting of stems, improvements in shoot growth, number of kernels/ear, number of ears/m$^2$, number of stolons and/or number of flowers, enhanced harvest index, bigger leaves, less dead basal leaves, improved phyllotaxy, earlier maturation/earlier fruit finish, homogenous riping, increased duration of grain filling, better fruit finish, bigger fruit/vegetable size, sprouting resistance and reduced lodging.

In embodiments, the compositions, formulations and methods provide sustainable agriculture, comprising nutrient use efficiency, especially nitrogen (N)-use efficiency, phosphorus (P)-use efficiency, water use efficiency, improved transpiration, respiration and/or $CO_2$ assimilation rate, better nodulation, improved Ca-metabolism etc.

In embodiments, improvements can be in the form of delayed senescence, comprising improvement of plant physiology, a longer duration of green leaf coloration of the plant and thus comprising colour (greening), water content, dryness etc. This can have the benefit of greater flexibility in the harvesting time.

In embodiments, improvements can be in the form of a more developed root system. The term "more developed root system" or "improved root growth" refers to longer root system, deeper root growth, faster root growth, higher root dry/fresh weight, higher root volume, larger root surface area, bigger root diameter, higher root stability, more root branching, higher number of root hairs, and/or more root tips and can be measured by analyzing the root architecture with suitable methodologies and analysis.

In embodiments, improvements can be in the form of water use. The term "crop water use efficiency" refers technically to the mass of agriculture produce per unit water consumed and economically to the value of product(s) produced per unit water volume consumed and can e.g. be measured in terms of yield per hectare (ha), biomass of the plants, thousand-kernel mass, and the number of ears per m$^2$.

In embodiments, improvements can be in the form of nitrogen use. The term "nitrogen-use efficiency" refers technically to the mass of agriculture produce per unit nitrogen consumed and economically to the value of product(s) produced per unit nitrogen consumed, reflecting uptake and utilization efficiency.

Improvement in greening/improved colour and improved photosynthetic efficiency as well as the delay of senescence can be measured with well-known techniques such as a Handy PEA system (Hansatech), net photosynthetic rate (Pn), measurement of the chlorophyll content, e.g. by the pigment extraction method of Ziegler and Ehle, measurement of the photochemical efficiency (Fv/Fm ratio), determination of shoot growth and final root and/or canopy biomass, determination of tiller density as well as of root mortality.

The methods described herein can be used at any growth stage during development of the plant, including vegetative, emergence, pollination and reproductive stages, depending on the plant and the desired effect. However, in embodiments, certain stages are targeted for the contacting of the compositions and formulations to promote specific effects. Stages are recognized in growing degree units (GDUs) as is known by those of ordinary skill. For example, in corn, the methods can be advantageously used post-emergence, in particular, during pollination. More specifically, the methods can be used during the tassel stage (VT) through the silking stage (R1).

V. Articles of Manufacture

In another aspect, described herein are articles of manufacture, for example, a "kit," containing the pyroglutamic acid and a strobilurin fungicide. The kit comprises a container comprising pyroglutamic acid. The kit can further comprise a separate container comprising the strobilurin fungicide. The kit advantageously can contain pre-measured amounts, for example, in amounts set forth elsewhere herein, of each of the components such that, for example, a tank-mix can be easily prepared by the end-user by combining the contents of the kit in a solvent, such as water. The kit may further comprise a label or package insert, on or associated with the container. The term "package insert" is used to refer to instructions customarily included in agricultural packages, and can contain usage, application rates, and warnings concerning the use of the components. Suitable containers for inclusion in the kit include, for example, bottles, vials, syringes, blister pack, etc. The container may be formed from a variety of materials such as glass or plastic.

Particular embodiments of the subject matter described herein include:

1. A composition comprising pyroglutamic acid and a strobilurin fungicide.
2. The composition of any above embodiment, where the strobilurin is selected from the group consisting of pyraclostrobin, azoxystrobin, dimoxystrobin, enestroburin, fluoxastrobin, kresoxim-methyl, metominostrobin, orysastrobin, picoxystrobin, pyribencarb, trifloxystrobin, pyrametostrobin, pyraoxystrobin, coumoxystrobin, coumethoxystrobin, triclopyricarb (chlorodincarb), fenaminstrobin (diclofenoxystrobin), fenoxystrobin, 2-(2-(6-(3-chloro-2-methyl-phenoxy)-5-fluoro-pyrimidin-4-yloxy)-phenyl)-2-methoxyimino-N-methyl-acetamide, 3-methoxy-2-(2-(N-(4-methoxy-phenyl)-cyclopropane-carboximidoylsulfanylmethyl)-phenyl)-acrylic acid methyl ester, methyl (2-chloro-5-[1-(3-methylbenzyloxyimino) ethyl]benzyl)carbamate and 2-(2-(3-(2,6-dichlorophenyl)-1-methyl-allylideneaminooxymethyl)-phenyl)-2-methoxy-imino-N methyl-acetamide.
3. The composition of any above embodiment, wherein the strobilurin is selected from the group consisting of pyraclostrobin, azoxystrobin, trifloxystrobin, and fluoxastrobin; or the strobilurin is selected from the group consisting of pyraclostrobin and azoxystrobin; or the strobilurin is pyraclostrobin.
4. The composition of any above embodiment, wherein the pyroglutamic acid and the strobilurin are present in synergistically effective amounts.
5. The composition of any above embodiment, wherein the pyroglutamic acid is present in an amount from about 10% w/w to about 90% w/w or from about 40% w/w to about 80% w/w of the composition.
6. The composition of any above embodiment, wherein the pyroglutamic acid is present in an amount from about 50% w/w to about 70% w/w of the composition.
7. The composition of any above embodiment, wherein the pyroglutamic acid is present in an amount from about 55% w/w to about 65% w/w of the composition.
8. The composition of any above embodiment, wherein the strobilurin fungicide is present in an amount from about 20% w/w to about 60% w/w of the composition.
9. The composition of any above embodiment, wherein the strobilurin fungicide is present in an amount from about 30% w/w to about 50% w/w of the composition.
10. The composition of any above embodiment, wherein the strobilurin fungicide is present in an amount from about 35% w/w to about 45% w/w w/w of the composition.
11. The composition of any above embodiment, wherein the pyroglutamic acid is L-pyroglutamic acid.
12. The composition of any above embodiment, wherein the pyroglutamic acid is a mixture of L- and D-pyroglutamic acid in a ratio of L to D of from about 80:20 to about 97:3.
13. The composition of any above embodiment, further comprising phosphite.
14. The composition of any above embodiment, further comprising a chelating agent.
15. The composition of any above embodiment, further comprising dimethyl sulfone.
16. The composition of any above embodiment, comprising pyroglutamic acid in an amount from about 10% w/w to about 90% w/w or from about 40% w/w to about 80% w/w, a strobilurin in an amount from about 20% w/w to about 60% w/w, and one or more chelating agents.
17. The composition of any above embodiment, wherein the strobilurin is pyraclostrobin, and the one or more chelating agents comprise an iron chelating agent, a manganese chelating agent, and a zinc chelating agent.
18. The composition of any above embodiment, comprising pyroglutamic acid in an amount of about 62% w/w, a strobilurin in an amount of about 38% w/w, and one or more chelating agents.
19. The composition of any above embodiment, further comprising a triconazole.
20. The composition of any above embodiment, further comprising a triconazole, wherein the triconazole is present in an amount of from about 0.7:1 to about 1:3, relative to the amount of strobilurin.

21. The composition of any above embodiment, further comprising a triconazole, wherein the triconazole is propiconazole.
22. The composition of any above embodiment, further comprising soluble potash, sulfur, boron, manganese, iron and zinc.
23. A method of increasing the yield of a plant comprising, applying to the plant a composition comprising, pyroglutamic acid and a strobilurin fungicide, wherein the yield is measured in bu/A.
24. The method of any above embodiment, wherein the composition further comprises a triazole.
25. The method of any above embodiment, wherein the composition further comprises a triazole, wherein the triconazole is present in an amount of from about 0.7:1 to about 1:3, relative to the amount of strobilurin.
26. The method of any above embodiment, wherein the composition further comprises a triazole, wherein the triconazole is propiconazole.
27. The method of any above embodiment, wherein the applying comprises contacting at a rate of about 50 g to about 100 g per acre of pyroglutamic acid, or about 100 g to about 120 g per acre of pyroglutamic acid, and about 60 g to about 80 g per acre of strobilurin.
28. The method of any above embodiment, wherein the applying comprises contacting at a rate of about 105 g to about 115 g per acre of pyroglutamic acid and about 65 g to about 75 g per acre of strobilurin.
29. The method of any above embodiment, wherein the applying comprises contacting at a rate of about 107 g to about 110 g per acre of pyroglutamic acid and about 66 g to about 69 g per acre of strobilurin.
30. The method of any above embodiment, wherein the plant is in a post-vegetative stage.
31. The method of any above embodiment, wherein the plant is in the VT stage to the R1 stage.
32. The method of any above embodiment, wherein said plant is selected from the group consisting of cereals (wheat, barley, oats, triticale, rye, rice), maize, soya beans, potatoes, vegetables, peanuts, cotton, oilseed rape and fruit plants.
33. The method of any above embodiment, wherein the plant is maize or rice.
34. The method of any above embodiment, wherein the yield in bu/A is increased about 5% to about 15% as compared to an untreated plant.
35. The method of any above embodiment, wherein the yield in bu/A is increased about 10% as compared to an untreated plant.
36. The method of any above embodiment, wherein the composition comprises pyroglutamic acid in an amount of about 62% w/w, a strobilurin in an amount of about 38% w/w, and one or more chelating agents, the plant is maize, and the yield in bu/A is increased about 10% as compared to an untreated maize.
37. The method of any above embodiment, wherein the pyroglutamic acid is L-pyroglutamic acid.
38. The method of any above embodiment, wherein the pyroglutamic acid is a mixture of L- and D-pyroglutamic acid in a ratio of L to D of from about 80:20 to about 97:3.
39. The method of any above embodiment, wherein the pyroglutamic acid is present in an amount from about 40% w/w to about 80% w/w, and the strobilurin is present in an amount from about 20% w/w to about 60% w/w, and one or more chelating agents.
40. The method of any above embodiment, wherein the strobilurin is pyraclostrobin, and the one or more chelating agents comprise an iron chelating agent, a manganese chelating agent, and a zinc chelating agent.
41. The method of any above embodiment, wherein pyroglutamic acid is present in an amount of about 62% w/w, pyraclostrobin is present in an amount of about 38% w/w, and applying the composition comprises contacting at a rate of about 107 g to about 110 g per acre of pyroglutamic acid and about 66 g to about 69 g of strobilurin, wherein the yield in bu/A is increased about 5% to about 15% as compared to an untreated plant.
42. A method of improving the health of plant comprising, applying to the plant a composition comprising, pyroglutamic acid and a strobilurin fungicide.
43. The method of any above embodiment, wherein the composition further comprises a triazole.
44. The method of any above embodiment, wherein the composition further comprises a triazole, wherein the triconazole is present in an amount of from about 0.7:1 to about 1:3, relative to the amount of strobilurin.
45. The method of any above embodiment, wherein the composition further comprises a triazole, wherein the triconazole is propiconazole.
46. A formulation comprising, pyroglutamic acid and a strobilurin fungicide, and an excipient, wherein the formulation is a type selected from the group consisting of emulsifiable concentrate, soluble concentrate, oil-in-water emulsion, microemulsion, oil based suspension concentrate, suspension concentrate, and dispersible concentrate.
47. The formulation of any above embodiment, wherein the excipient is a surfactant or extender.
48. The method of any above embodiment, wherein the formulation further comprises a triazole.
49. The method of any above embodiment, wherein the formulation further comprises a triazole, wherein the triconazole is present in an amount of from about 0.7:1 to about 1:3, relative to the amount of strobilurin.
50. The method of any above embodiment, wherein the formulation further comprises a triazole, wherein the triconazole is propiconazole.
51. A method of preparing the composition of any above embodiment comprising, contacting in a vessel pyroglutamic acid with a strobilurin fungicide and allowing the pyroglutamic acid and the strobilurin fungicide to mix in the vessel, wherein the composition is prepared.
52. The method of embodiment 51, wherein the pyroglutamic acid is present in an amount from about 40% w/w to about 80% w/w and the strobilurin is present in an amount of about 20% w/w to about 60% w/w of the composition.
53. The method of embodiment 50, wherein the contacting further includes contacting in the vessel, a triazole.

The following examples are offered by way of illustration and not by way of limitation. Certain data are amenable for use in a Colby Analysis to show synergism. The Colby equation:

Expected value $(E)=(X*Y)/100$, where X and Y are the effects of the active agents applied alone (expressed as % of control). The actual value determined for the effect is compared to the expected value. If greater=synergism; if less than=antagonism; if equal=additive.

EXAMPLES

Example 1: Preparation of Composition

An exemplary composition was prepared as follows: pyroglutamic acid (PGA) supplied as TAKE OFF® Liquid Sulfone and pyraclostrobin supplied as HEADLINE®. TAKE OFF® Liquid Sulfone: 9.75% w/w pyroglutamic acid (1107 g PGA per gallon).

HEADLINE® contains 2.09 lbs. per gallon pyraclostrobin; 9 ounces contains approx. 279 g pyraclostrobin.

Example 2: Foliar Application at VT-R1 Stage in Corn

The composition of Example 1 was tested by foliar application at the VT-R1 stage in corn. Data are from five trials. Data represents 100% of all trials. TAKE OFF® VLS 3215-05 (TAKE OFF® Liquid Sulfone) @ 1 qt/A=100 g ai PGA. CV=6.33%; P value=0.0029; LSD=6.62. Key assessments are disease control, staygreen, and adjusted yield at 15.5% moisture.

RESULTS: Pyroglutamic Acid (applied as TAKE OFF® Liquid Sulfone) at approximately 108 g ai/A to pyraclostrobin (applied as HEADLINE® strobilurin fungicide at 9 fl oz/A) at approximately 67 g ai/A was applied at the tassel (VT) to silking (R1) stage in corn. Data show substantially improved plant health (as evidenced by stay-green differences), disease control, and yield versus HEADLINE® applied alone at the same rate. The data for % staygreen are depicted in Table 1.

TABLE 1

| | % staygreen in lower ½ of canopy: 51-53 DAT | | |
|---|---|---|---|
| | | 53 DAT | |
| Treatment # | Foliar Treatment (Tassel Stage) | Agritech WI | Agritech2 WI | Avg. 2 WI Trials |
| 1 | Untreated Check | 50.0 c | 50.0 b | 50.0 c |
| 2 | VLS 3215-05 @ 1 qt/A | 65.0 b | 55.0 b | 60.0 b |
| 3 | HEADLINE ® @ 9 fl. oz./A | 71.1 ab | 63.3 a | 67.7 a |
| 4 | HEADLINE ® @ 9 fl. oz./A + VLS 3215-05 @ 1 qt/A | 75.0 | 66.7 a | 70.6 a |
| | | P = 0.0001 | P = 0.0001 | P = 0.0001 |

The data for improved disease resistance are shown in Table 2.

TABLE 2

| | Percent Reduction in Disease Severity | | | | |
|---|---|---|---|---|---|
| Trt # | Foliar Treatement (Tassel Stage) | Buckeye OH Cercospora | Agritech WI Eyespot > Grey Leaf Spot > Common Rust | Agritech2 WI Eyespot > Common Rust | Average OH, WI (2) All Diseases | Percent Reduction vs. UTC |
| 1 | Untreated check | 63.3 a | 78.9 a | 93.4 a | 78.3a | |
| 2 | VLS 3215-05 @ 1 qt/A | 51.7 b | 24.8 b | 58.3 b | 45.0 b | −41.0 |
| 3 | HEADLINE ® @ 9 fl. oz./A | 43.3 c | 23.2 b | 42.5 c | 36.4 c | −52.0 |
| 4 | HEADLINE ® @ 9 fl. oz./A + VLS 3215-05 @ 1 qt/A | 45.0 c | 5.8 c | 34.2 c | 28.3 d | −62.0 |
| | | P = 0.0003 | P = 0.0001 | P = 0.0001 | P = 0.0001 | |

The data for improved yield are shown in Table 3 and FIG. 1.

TABLE 3

| | Improved Yield in Corn at Tassel Stage | | | |
|---|---|---|---|---|
| Trt# | Foliar Treatement (Tassel Stage) | Buckeye OH | Agritech WI | Acres IA |
| 1 | Untreated check | 241.8 ab | 224.5 c | 240.9 b |
| 2 | VLS 3215-05 @ 1 qt/A | 233.7 b | 235.5 b | 246.3 b |
| 3 | HEADLINE ® @ 9 fl. oz./A | 251.2 a | 232.9 b | 245.8 b |
| 4 | HEADLINE ® @ 9 fl. oz./A + VLS 3215-05 @ 1 qt/A | 253.0 a | 244.6 a | 256.9 a |
| | | P = 0.1170 | P = 0.0021 | P = 0.0062 |

Figure 2:
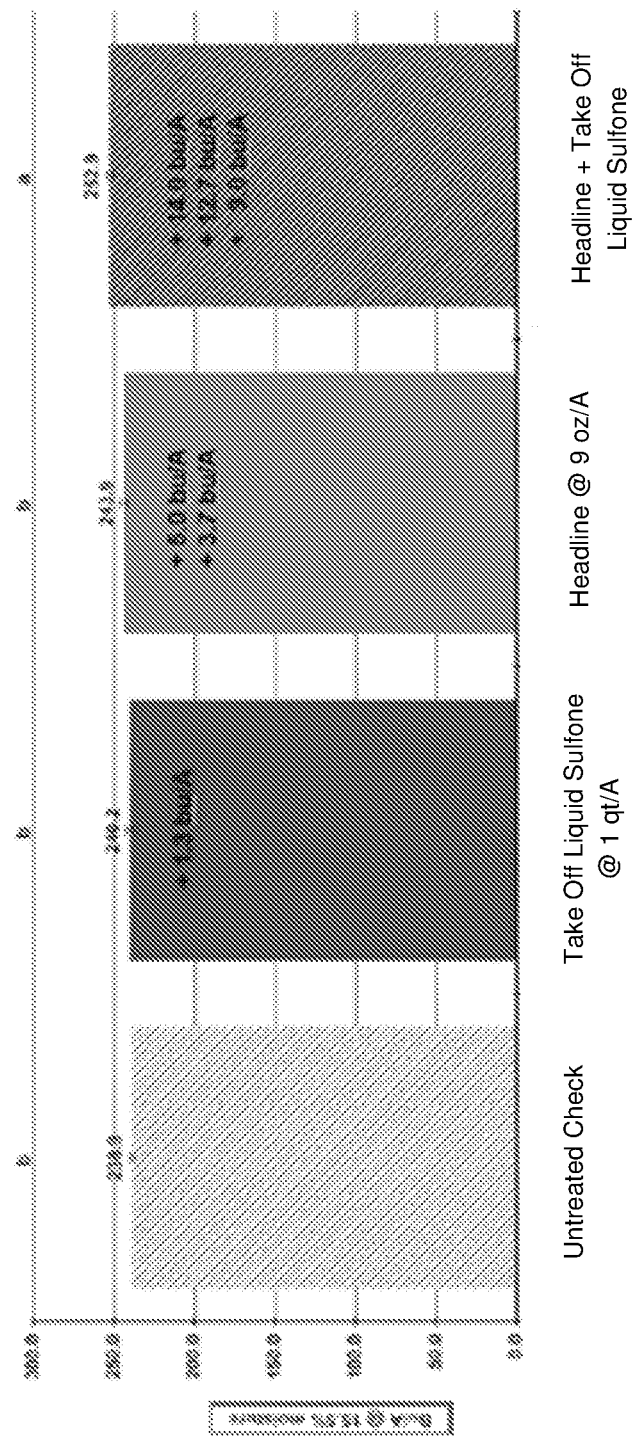
FIG. 2 depicts data for improved yield of the combination as compared to pyraclostrobin alone when applied at VT-R1 stages in corn.

Additional data for improved yield are depicted in FIG. 2.

Example 3: Average Corn Yield—Application at VT-R1 Stage in Corn

Figure 3:
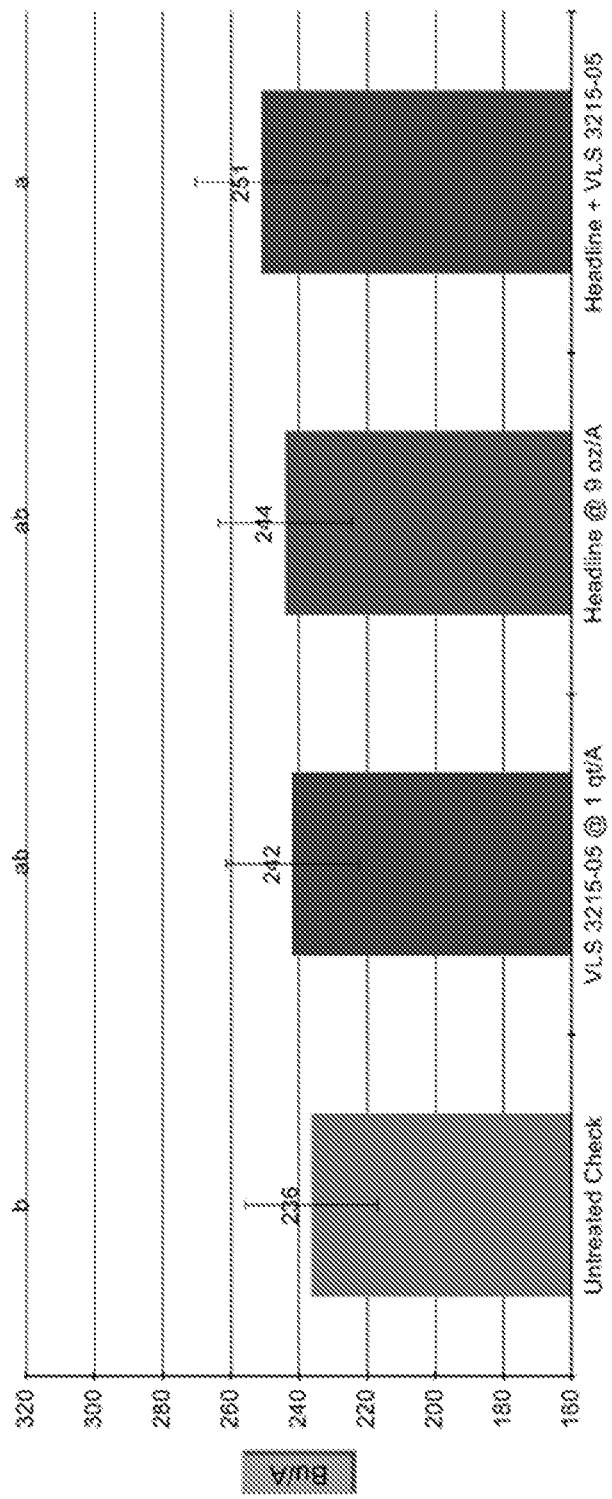
FIG. 3 depicts data for average corn yield across 10 trials. Take Off VLS 3215-05 @ 1 qt/A=3.5 oz PGA/A or 250 g PGA/Ha and pyraclostrobin at 9 oz/A, alone or in combination, was applied at VT-R1 stage in corn.

FIG. 3 depicts data for average corn yield across 10 trials. Take Off VLS 3215-05 @ 1 qt/A=3.5 oz PGA/A or about 250 g PGA/Ha and pyraclostrobin (applied as HEADLINE) at 9 oz/A (67 g pyraclostrobin per acre or 160 g pyraclostrobin/HA), alone or in combination, was applied at VT-R1 stage in corn. Data from 5 trials conducted in year 1 in IA, OH, SD and WI-2, and 5 trials conducted in year 2 in IA-2, MN, MO and WI on corn. Data represents 83% of all trials. Two trials in OH (=excessive rainfall) and IL (=excessive drought) not used due to the excessive conditions and effect on average yields. Actual yield averages: Untreated Check=236.47; VLS 3215-05=241.91; Headline=244.21; and Headline+VLS 3215-05=251.08 bu/A. Data rounded to nearest whole number. (10 Trials; P=0.01; CV=9.42%; P value=0.0149; LSD=11.6).

Colby analysis: Colby expected (E): [X*Y]/100= [102.41*103.78]/100=106.28.

Observed (106.75) is greater than expected (106.75)

Data are shown in Table 4.

TABLE 4

| Average Corn Yield | | |
|---|---|---|
|  | Bu/A | % of UTC |
| Untreated Control | 236 | 100.00 |
| VLS 3215-05 @ 1 qt/A | 242 | 102.41 ab |
| Pyraclostrobin (HEADLINE) @ 9 oz/A | 244 | 103.78 ab |
| VLS 3215-05 + pyraclostrobin (HEADLINE) | 251 | 106.75 b [P = 0.0101 (LSD P = 0.05)] |

Example 4: Grain Protein Content—Application at VT-R1 Stage in Corn

Figure 4:
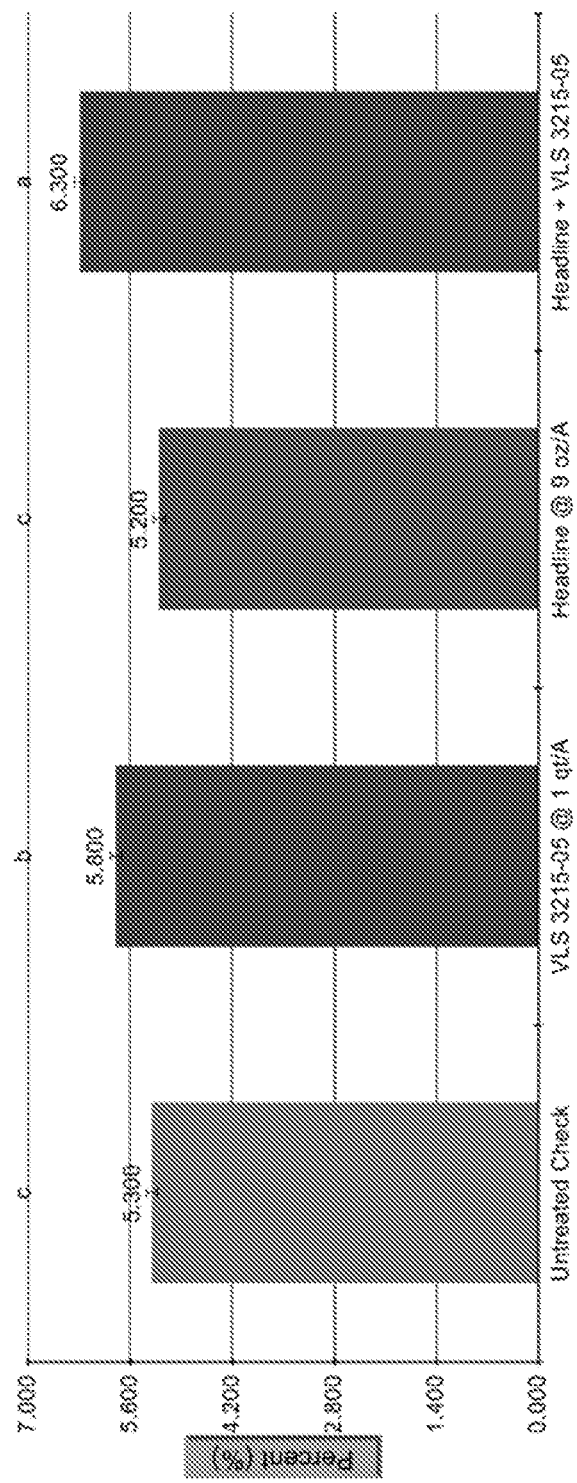
FIG. 4 depicts grain protein content data of the actives when applied alone and in combination at VT-R1 stage in corn.

FIG. 4 depicts data for grain protein content. Take Off VLS 3215-05 @ 1 qt/A=3.5 oz PGA/A or about 250 g PGA/Ha and pyraclostrobin (applied as HEADLINE) at 9 oz/A, alone or in combination, was applied at VT-R1 stage in corn. Untreated Check=5.300; VLS 3215-05=5.800; Headline=5.200; and Headline+VLS 3215-05=6.300. Data rounded to nearest whole number. (P=0.05; CV=6.53%; P value=0.05; LSD=0.5).

Colby analysis: Colby expected (E): [X*Y]/100= [109.8*98.2]/100=107.8.

Observed (119.4) is greater than expected (107.8)

Data are shown in Table 5.

TABLE 5

| Average Corn Yield | | |
|---|---|---|
|  | Percent (%) | % of UTC |
| Untreated control | 5.300 | 100.00 |
| VLS 3215-05 @ 1 qt/A | 5.800 | 109.8 b |
| Pyraclostrobin (HEADLINE) @ 9 oz/A | 5.200 | 98.2 a |
| VLS 3215-05 + pyraclostrobin (HEADLINE) | 6.300 | 119.4 c [P = 0.0004 (LSD P = 0.05)] |

Example 5: Grain Yield in Rice—Application at Panicle Initiation in Rice

Propiconazole and trifloxystrobin were tested for the effect of combination with VLS 3215-05 on grain yield. The results show a synergistic effect of the combination as compared to untreated control and the individual active agents.

Figure 5:
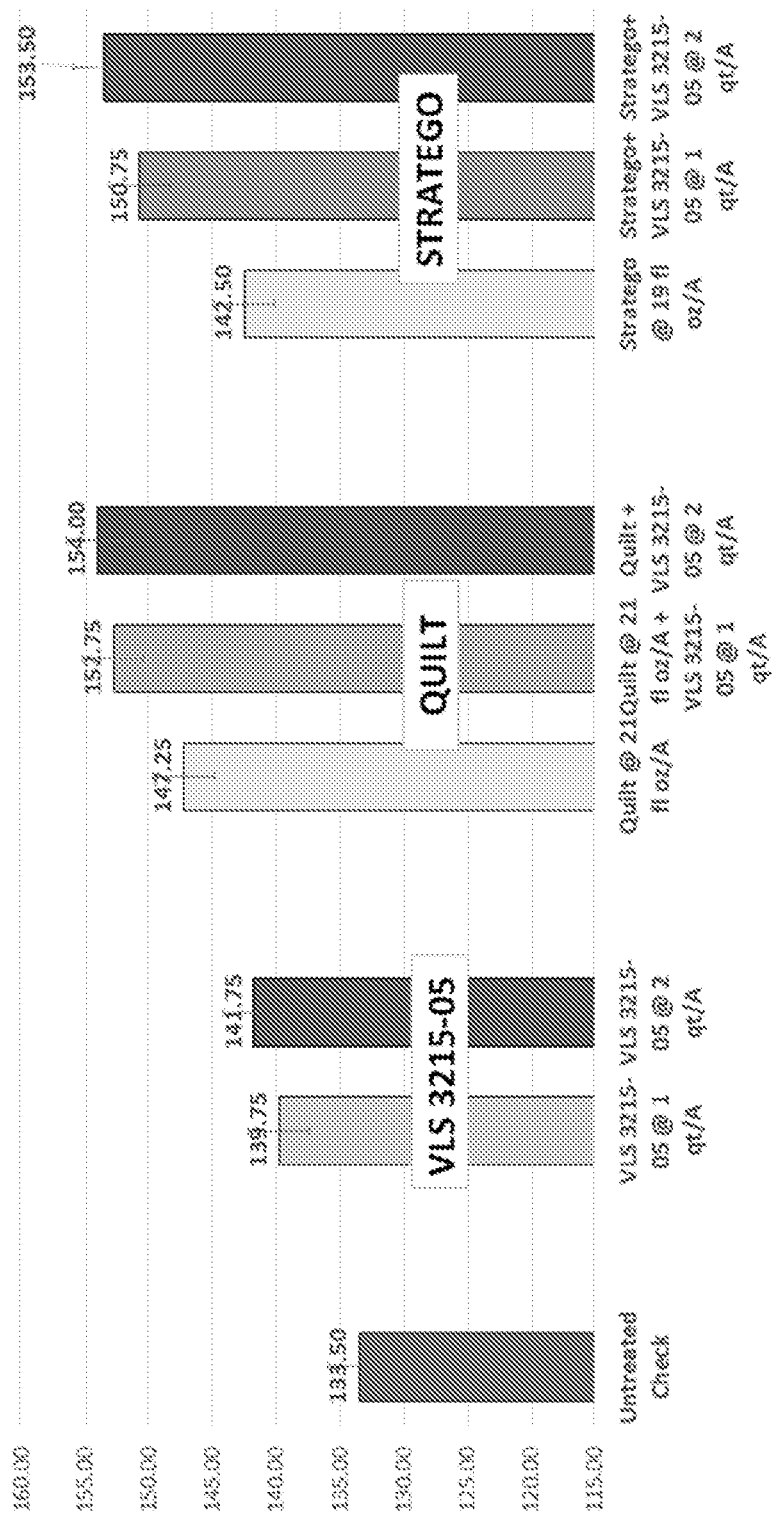
FIG. 5 depicts grain yield data in Bu/A of the actives when applied alone and in combination at the panicle initiation stage in rice.
Figure 6:
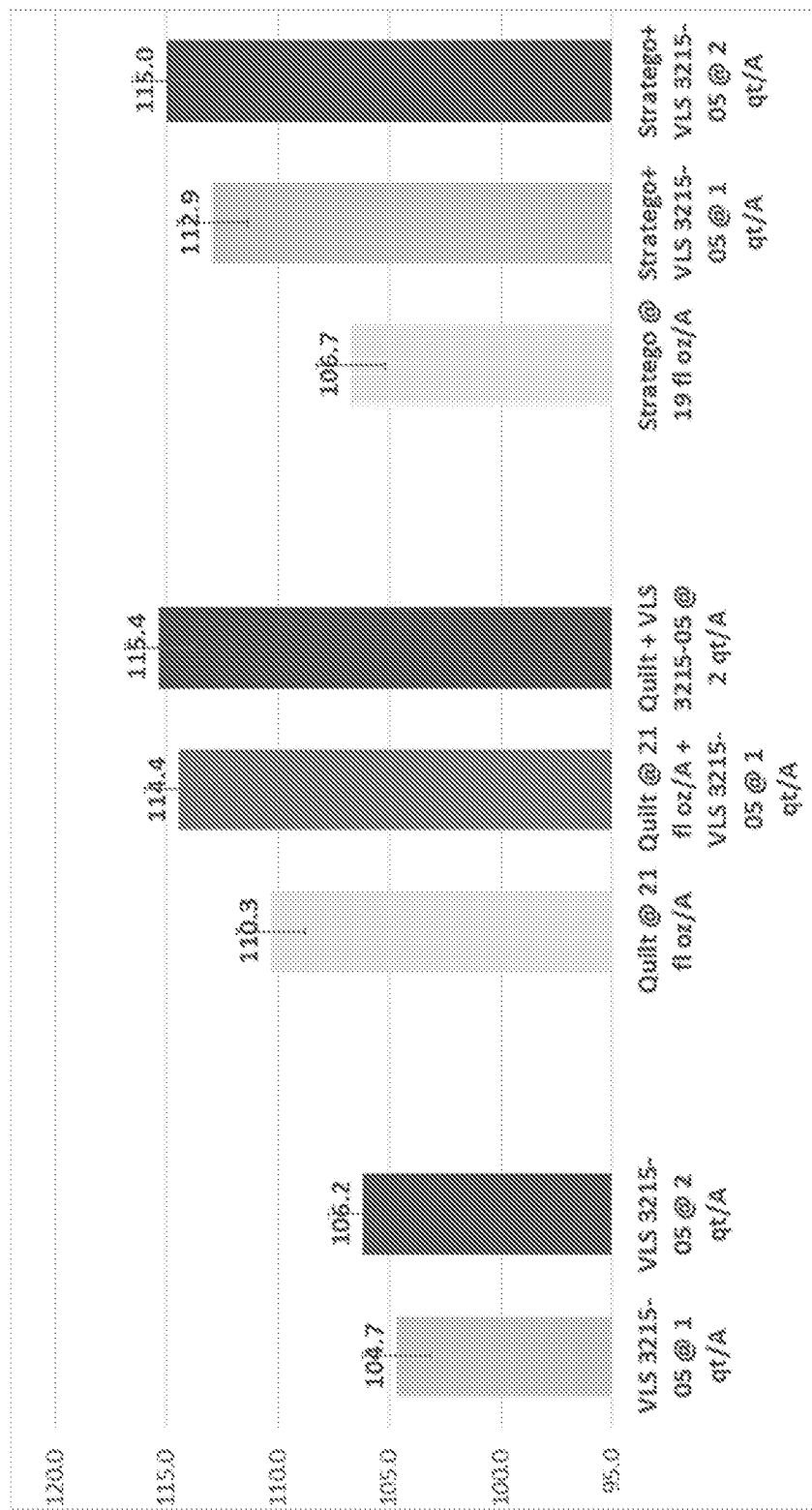
FIG. 6 depicts grain yield data in Bu/A of the actives when applied alone and in combination at the panicle initiation stage in rice.

FIGS. 5 and 6 depict data for grain yield in rice. Take Off VLS 3215-05 @ 1 qt/A=3.5 oz PGA/A or 250 g PGA/Ha and azoxystrobin and propiconazole (applied as QUILT) at 21 oz/A, alone or in combination, was applied at panicle initiation in rice. Take Off VLS 3215-05 @ 2 qt/A=7.0 oz PGA/A or 500 g PGA/Ha and azoxystrobin and propiconazole (applied as QUILT) at 21 oz/A, alone or in combination, was applied at panicle initiation in rice. Each gallon of QUILT contains 1.04 lb propiconazole and 0.62 lb azoxystrobin and also contains inert ingredients and excipients. Take Off VLS 3215-05 @ 1 qt/A=3.5 oz PGA/A or 250 g PGA/Ha and trifloxystrobin and propiconazole (applied as STRATEGO) at 19 oz/A, alone or in combination, was applied at panicle initiation in rice. Take Off VLS 3215-05 @ 2 qt/A=7.0 oz PGA/A or 500 g PGA/Ha and trifloxystrobin and propiconazole (applied as STRATEGO) at 19 oz/A, alone or in combination, was applied at panicle initiation in rice. Each gallon of STRATEGO contains 1.04 lb propiconazole and 1.04 lb trifloxystrobin and also contains inert ingredients and excipients. Data are shown in Table 6.

TABLE 6

| Grain yield in rice. | | |
|---|---|---|
| Treatment | Bu/A | % of UTC |
| (UTC) Untreated control | 133.50b | 100.00 |
| (1-1) VLS 3215-05 @ 1 qt/A | 139.75ab | 104.7 |
| (1-2) VLS 3215-05 @ 2 qt/A | 141.75ab | 106.2 |
| (2-1) Azoxystrobin and Propiconazole (as QUILT) @ 21 oz/A | 147.25ab | 110.3 |
| (3-1) VLS 3215-05 @ 1 qt/A and Azoxystrobin Propiconazole (as QUILT) @ 21 oz/A | 152.75a | 114.4 |
| (3-2) VLS 3215-05 @ 2 qt/A and Propiconazole (as QUILT) @ 21 oz/A | 154.00a | 115.4 |
| (4-1) Trifloxystrobin and propiconazole (applied as STRATEGO)@ 19 oz/A | 142.50ab | 106.7 |
| (4-2) VLS 3215-05 @ 1 qt/A and Trifloxystrobin and propiconazole (applied as STRATEGO) @ 19 oz/A | 150.75a | 112.9 |
| (4-3) VLS 3215-05 @ 2 qt/A and Trifloxystrobin and propiconazole (applied as STRATEGO) @ 19 oz/A | 153.50a | 115.0 |

Data rounded to nearest whole number. The mean separation is provided in the table and the mean separation was a LSD test at p=0.10.

Colby analysis: Yields as a percent of untreated control were calculated and expected values were calculated using the Colby equation shown above. See, FIG. 6. Data are shown in Table 7.

TABLE 7

| Data for Colby analysis | | | |
|---|---|---|---|
| Treatment | Expected Grain Yield | Bu/A | Colby Analysis |
| 3-1 | 115.5 | 152.8 | Not Synergistic |
| 3-2 | 117.1 | 154.0 | Not Synergistic |
| 4-2 | 111.7 | 150.8 | Synergistic |
| 4-3 | 113.3 | 153.5 | Synergistic |

Example 6: Assessment of Phytotoxicity, Grain Weight, Grain Moisture and Grain Yield in Rice Data collected for a series of experiments to determine phytotoxicity, moisture, grain weight and yield and the statistical analyses are provided below. Compounds were applied at pinnacle initiation stage. Effects were determined at R9 stage. The data demonstrate that the combinations produce desirable effects as well as demonstrate that the combinations do not produce undesirable effects. The data are provided in Table 7.

TABLE 7

Raw data for series of experiments.

| Treatment | Rate Unit | Phytotoxicity | Grain Weight | Grain Moisture | Grain Yield |
|---|---|---|---|---|---|
| UTC | — | 0.0a | 8.93b | 14.20a | 134b |
| PGA[1] | 1 lb/a | 0.0a | 9.38ab | 14.48a | 140ab |
| PGA[1] | 2 lb/a | 0.0a | 9.50ab | 14.46a | 142ab |
| Azoxystrobin[2] | 21 fl oz/a | 0.0a | 9.88ab | 14.60a | 147ab |
| Trifloxystrobin[3] | 19 fl oz/a | 0.0a | 9.55ab | 14.48a | 143ab |
| PGA[1] + Azoxystrobin[2] | 1 lb/a 21 fl oz/a | 0.0a | 10.20a | 14.25a | 153a |
| PGA[1] + Azoxystrobin[2] | 2 lb/a 21 fl oz/a | 0.0a | 10.30a | 14.40a | 154a |
| PGA[1] + Azoxystrobin[3] | 1 lb/a 19 fl oz/a | 0.0a | 10.08a | 14.30a | 151a |
| PGA[1] + Azoxystrobin[3] | 2 lb/a 21 fl oz/a | 0.0a | 10.28a | 14.43a | 154a |
| LSD P = 10 | | | 0.644 | 0.427 | 9.6 |
| Std. Dev. | | 0.00 | 0.532 | 0.353 | 7.9 |
| CV | | 0.0 | 5.44 | 2.45 | 5.43 |
| Bartlett's X2 | | 0.0 | 26.893 | 12.704 | 28.384 |
| P(Bartlett's X2) | | | 0.001 | 0.122 | 0.001 |
| Skewness | | | −0.2436 | 0.4163 | −0.2798 |
| Kurtosis | | | 1.5302 | 1.109 | 1.4274 |
| Replicate F | | 0.000 | 0.503 | 0.933 | 0.478 |
| Replicate Prob(F) | | 1.0000 | 0.6839 | 0.4400 | 0.7004 |
| Treatment(F) | | 0.000 | 3.201 | 0.522 | 3.205 |
| Treatment Prob(F) | | 1.0000 | 0.0128 | 0.8285 | 0.0128 |

[1]PGA applied as solid Take Off sulfone solid
[2]Azoxystrobin applied as QUILT
[3]Trifloxystrobin applied as STRATEGO Fisher's LDS (Least Significant Difference) was applied to identify statistically significant differences among average values for a given set of treatments, at a given p-level (p=0.10 in the rice data). Different letters assigned in such a test identify statistically different groups. The letter assignments are specific to a particular parameter, where "a", "b", etc for e.g. phytotoxicity does not apply to another parameter, e.g. yield. For plant phytotoxicity: all mean values were assigned an "a," which demonstrates that all of the treatments were the same statistically as the untreated control. The combination product did not cause phytotoxicity. For Grain weight & Grain yield: Grain weight is a significant component of yield, and as such, the data pattern here is similar to that of grain yield. For both parameters, untreated control is assigned a "b," the individual chemical treatments at their various rates were assigned an "ab", and the combined treatments were assigned an "a". This means that the untreated control differed from the all of the combined treatments. The combination of PGA with either fungicide elicits a statistically significant increase in grain weight and yield, compared to the control. Grain moisture: This is a quality parameter which was not affected by any of the treatments.

All technical and scientific terms used herein have the same meaning. Efforts have been made to ensure accuracy with respect to numbers used (e.g. amounts, temperature, etc.) but some experimental errors and deviations should be accounted for.

Throughout this specification and the claims, the words "comprise," "comprises," and "comprising" are used in a non-exclusive sense, except where the context requires otherwise. It is understood that embodiments described herein include "consisting of" and/or "consisting essentially of" embodiments.

As used herein, the term "about," when referring to a value is meant to encompass variations of, in some embodiments±50%, in some embodiments±20%, in some embodiments±10%, in some embodiments±5%, in some embodiments±1%, in some embodiments±0.5%, and in some embodiments±0.1% from the specified amount, as such variations are appropriate to perform the disclosed methods or employ the disclosed compositions.

Where a range of values is provided, it is understood that each intervening value, to the tenth of the unit of the lower limit, unless the context clearly dictates otherwise, between the upper and lower limit of the range and any other stated or intervening value in that stated range, is encompassed. The upper and lower limits of these small ranges which may independently be included in the smaller rangers is also encompassed, subject to any specifically excluded limit in the stated range. Where the stated range includes one or both of the limits, ranges excluding either or both of those included limits are also included.

Many modifications and other embodiments set forth herein will come to mind to one skilled in the art to which this subject matter pertains having the benefit of the teachings presented in the foregoing descriptions and the associated drawings. Therefore, it is to be understood that the subject matter is not to be limited to the specific embodiments disclosed and that modifications and other embodi- That which is claimed:

1. A composition comprising pyroglutamic acid and a strobilurin fungicide, wherein the strobilurin fungicide is pyraclostrobin or trifloxystrobin, and wherein the composition further comprises propiconazole when the strobulin fungicide is trifloxystrobin.

2. The composition of claim 1, wherein the strobilurin is pyraclostrobin.

3. The composition of claim 1, wherein the pyroglutamic acid and the strobilurin fungicide are present in synergistically effective amounts.

4. The composition of claim 1, wherein the pyroglutamic acid is present in an amount from about 55% w/w to about 65% w/w of the composition.

5. The composition of claim 1, wherein the strobilurin fungicide is present in an amount from about 35% w/w to about 45% w/w of the composition.

6. The composition of claim 1, wherein the pyroglutamic acid is a mixture of L- and D- pyroglutamic acid in a ratio of L to D of from about 80:20 to about 97:3.

7. The composition of claim 1, further comprising one or more of a phosphite, a chelating agent, or dimethyl sulfone.

8. The composition of claim 7, wherein the strobilurin is pyraclostrobin, and the one or more chelating agents comprise an iron chelating agent, a manganese chelating agent, and a zinc chelating agent.

9. A method of increasing the yield of a plant comprising applying to the plant a composition comprising pyroglutamic acid and a strobilurin fungicide selected from the group consisting of pyraclostrobin and trifloxystrobin, wherein the composition further comprises propiconzaole when the strobulin fungicide is trifloxystrobin, and wherein the yield is measured in bu/A.

10. The method of claim 9, wherein the applying comprises contacting at a rate of about 100 g to about 120 g per acre of pyroglutamic acid and about 60 g to about 80 g per acre of strobilurin fungicide.

11. The method of claim 9, wherein said plant is selected from the group consisting of cereals, wheat, barley, oats, triticale, rye, rice, maize, soya beans, potatoes, vegetables, peanuts, cotton, oilseed rape and fruit plants.

12. The method of claim 9, wherein the yield in bu/A is increased about 5% to about 15% as compared to an untreated plant.

13. The method of claim 9, wherein the pyroglutamic acid is a mixture of L- and D- pyroglutamic acid in a ratio of L to D of from about 80:20 to about 97:3.

14. The method of claim 9, wherein the strobilurin fungicide is pyraclostrobin, and the one or more chelating agents comprise an iron chelating agent, a manganese chelating agent, and a zinc chelating agent.

15. A formulation comprising pyroglutamic acid, a strobulin fungicide selected from the group consisting of pyraclostrobin, and trifloxystrobin, and an excipient, wherein the formulation further comprises propiconzole when the strobulin fungicide is trifloxystrobin, and wherein the formulation is a type selected from the group consisting of emulsifiable concentrate, soluble concentrate, oil-in-water emulsion, microemulsion, oil based suspension concentrate, suspension concentrate, and dispersible concentrate.

16. The formulation of claim 15, wherein the excipient is a surfactant or extender.

17. The composition of claim 1, further comprising a triazole.

18. The composition of claim 17, wherein the triazole is present in an amount of from about 0.7:1 to about 1:3, relative to the amount of strobilurin fungicide.

19. The composition of claim 18, wherein the triazole is propiconazole.

* * * * *